US 10,112,715 B2

(12) United States Patent
Whitmarsh et al.

(10) Patent No.: US 10,112,715 B2
(45) Date of Patent: Oct. 30, 2018

(54) SIGNALING PRINT SUBSTANCES

(71) Applicant: Hewlett-Packard Development Company, L.P., Houston, TX (US)

(72) Inventors: Mike Whitmarsh, Vancouver, WA (US); Benjiman White, Vancouver, WA (US); William E. Hertling, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 15/138,768

(22) Filed: Apr. 26, 2016

(65) Prior Publication Data
US 2017/0305550 A1   Oct. 26, 2017

(51) Int. Cl.
*B64D 1/18*   (2006.01)
*B64C 39/02*   (2006.01)

(52) U.S. Cl.
CPC .............. *B64D 1/18* (2013.01); *B64C 39/02* (2013.01); *B64C 2201/12* (2013.01); *B64C 2201/141* (2013.01)

(58) Field of Classification Search
CPC .................................. B64C 29/02; B64D 1/18
See application file for complete search history.

(56) References Cited

U.S. PATENT DOCUMENTS

| 6,626,375 | B1 * | 9/2003 | Ireland | B64D 1/18 169/53 |
| 8,989,922 | B2 | 3/2015 | Jones et al. | |
| 9,815,078 | B2 * | 11/2017 | Neustadt | B05B 13/005 |
| 2010/0289845 | A1 * | 11/2010 | Conway | B41J 3/60 347/16 |
| 2014/0032021 | A1 * | 1/2014 | Metzler | G01S 5/0036 701/3 |
| 2014/0217230 | A1 | 8/2014 | Helou, Jr. | |
| 2014/0233099 | A1 | 8/2014 | Stark et al. | |
| 2015/0254988 | A1 * | 9/2015 | Wang | G05D 1/0214 701/3 |
| 2015/0274294 | A1 * | 10/2015 | Dahlstrom | B64D 1/18 239/722 |
| 2015/0314434 | A1 * | 11/2015 | Bevins, Jr. | B23D 59/001 30/514 |
| 2016/0260207 | A1 * | 9/2016 | Fryshman | G06T 7/0008 |
| 2017/0147907 | A1 * | 5/2017 | Fryshman | G06K 9/6267 |
| 2017/0190104 | A1 * | 7/2017 | Bostick | B33Y 10/00 |
| 2017/0209885 | A1 * | 7/2017 | Neustadt | B05B 13/005 |

(Continued)

FOREIGN PATENT DOCUMENTS

WO   WO-2015085155         6/2015
WO   WO-2015162613 A1 * 10/2015 ........... B64C 39/024

OTHER PUBLICATIONS

192 Future Uses for Flying Drones, (Web Page) <http://www.futuristspeaker.com/2014/09/192-future-uses-for-flying-drones/>.

(Continued)

*Primary Examiner* — Justin M Benedik
(74) *Attorney, Agent, or Firm* — HP Inc. Patent Department

(57) ABSTRACT

An example unmanned aerial vehicle includes an electromagnetic radiation (EMR) sensor. The EMR sensor detects a signal indicative of a substance to print. The unmanned aerial vehicle also includes a nozzle to eject the substance based on a location at which the signal is detected.

20 Claims, 6 Drawing Sheets

(56) References Cited

U.S. PATENT DOCUMENTS

2017/0259920 A1* 9/2017 Lai ........................... B64D 1/18
2017/0291439 A1* 10/2017 Koyata ................... B41J 29/38
2017/0316283 A1* 11/2017 Fryshman ............ G06K 9/6267

OTHER PUBLICATIONS

Amato, A., Projector Drone Turns Any Surface into a Video Screen, (Web Page), Jun. 16, 2014, <http://dronelife.com/2014/06/26/projector-drone-turns-surface-video-screen/>.

'Flying 3D Printer' Could Play Key Role in Emergencies, (Web Page), May 7, 2014, <http://www.bbc.com/news/technology-27311292>.

Michael, Image Analysis: Color Detection for Multiple Robots, (Web Page), Aug. 17, 2011, <http://www.ludep.com/image-analysis-color-detection-for-multiple-robots/>.

Sabre Sky3D Uav LiDAR System Testing, (Web Page), Apr. 2, 2015, <http://www.sabresurvey.com/24,news,drone-lidar-mapping.html>.

\* cited by examiner

SIGNALING PRINT SUBSTANCES

BACKGROUND

Unmanned aerial vehicles may be able to fly without a pilot occupying the unmanned aerial vehicle. The unmanned aerial vehicle may be smaller and lighter than a manned aerial vehicle and thus consume less energy. As used herein, the term "unmanned aerial vehicle" refers to a vehicle able to achieve aerodynamic lift without applying the lift to a human occupant. For example, the unmanned aerial vehicle may be an autonomous aerial vehicle. The unmanned aerial vehicle may include a fixed wing to provide lift, a rotor to provide lift, a flapping wing to provide lift, or the like.

DETAILED DESCRIPTION

Unmanned aerial vehicles may print images on print targets, such as large surfaces. As used herein, the term "print target" refers to a material that receives an output from a printer. For example, the print target may include paper, a billboard, a wall, a print bed of a three-dimensional printer, or the like. The term "printer" refers to a system that outputs a substance at locations specified to the printer. For example, the printer may include an unmanned aerial vehicle and may output a printing liquid, toner, or the like to color the locations specified to the printer. In an example, the printer may output a substance that does not color the print target (e.g., a sealant, a coating, a melted filament, a material to be fused, etc.).

The unmanned aerial vehicles may determine their locations and print a substance based on the locations. For example, the unmanned aerial vehicles may determine their absolute positions based on a satellite navigation system. However, the positions determined based on the satellite navigation system may have limited precision. The precision may not be high enough to produce an image with a desired dot density. In an example, the unmanned aerial vehicles may determine their relative position based on the satellite navigation system, local radio triangulation, or the like. However, the unmanned aerial vehicle may need expensive hardware and a time-intensive setup, and the precision may still be insufficient for many applications.

The unmanned aerial vehicles may employ image recognition of the print target to determine the positions of the unmanned aerial vehicles, or a remote camera aimed at the unmanned aerial vehicles may use image recognition to determine the positions of the unmanned aerial vehicles. Image recognition may be computationally intensive and slow, so the printing may be slow or include errors from drifting of the unmanned aerial vehicles during computation of the positions. The unmanned aerial vehicles may also be limited to print targets without uniform surfaces when performing local image recognition. In an example, the unmanned aerial vehicles may include distance sensors to determine their position. However, the unmanned aerial vehicles may need perpendicular surfaces a uniform distance away in each orthogonal direction to determine their positions. In addition, multiple unmanned aerial vehicles may interfere with each other's position determination. Accordingly, printing by unmanned aerial vehicles may be improved with a precise and inexpensive way to determine where to print substances on a print target.

Figure 1:
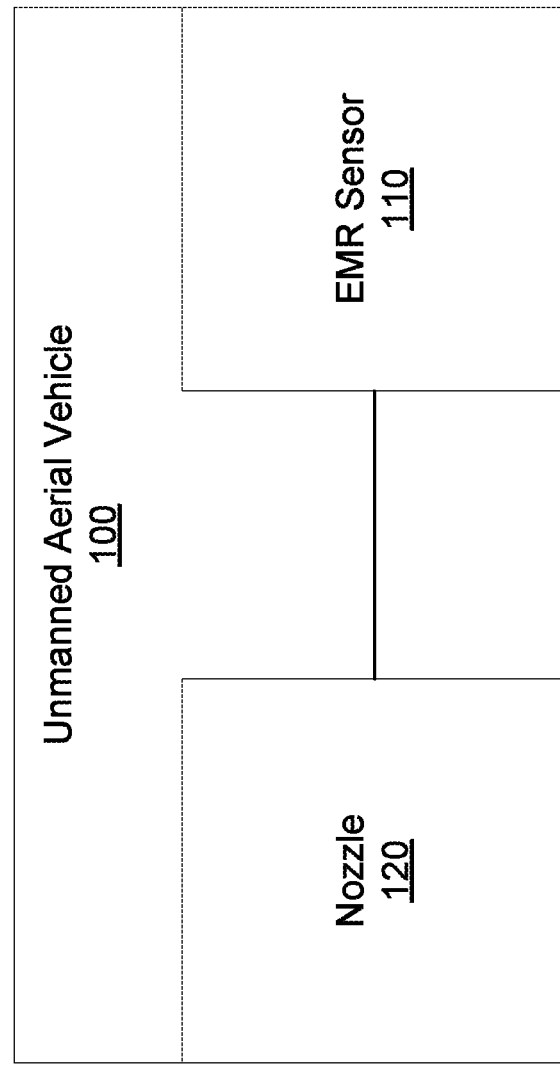
FIG. 1 is a block diagram of an example unmanned aerial vehicle to print on a print target.

FIG. 1 is a block diagram of an example unmanned aerial vehicle 100 to print on a print target. The unmanned aerial vehicle 100 may include an electromagnetic radiation (EMR) sensor 110. As used herein, the term "EMR sensor" refers to a device that measures an intensity of incident EMR. The EMR sensor 110 may include hardware (e.g., analog or digital circuitry) to demodulate an EMR signal, to generate an electrical signal indicative of the intensity of the incident EMR, or the like. The EMR sensor 110 may detect a signal indicative of a substance to print. For example, the frequency, amplitude, modulation, etc. of the EMR may indicate which substance should be printed.

The unmanned aerial vehicle 100 may also include a nozzle 120 to eject the substance based on a location at which the signal is detected. For example, the content of the signal may be indicative of the substance to print without the content of the signal being indicative of the location to print the substance. Rather, the location at which to print the substance may correspond to the location at which the signal is detected. As used herein, the term "signal content" refers to information encoded in the signal, for example, via modulation, selection of intensity or frequency, or the like. Signal content does not include an absolute location at which the signal is received. The nozzle 120 may eject the substance at the location at which the signal is detected, or the nozzle 120 may eject the substance at an offset from the location at which the signal is detected.

Figure 2:
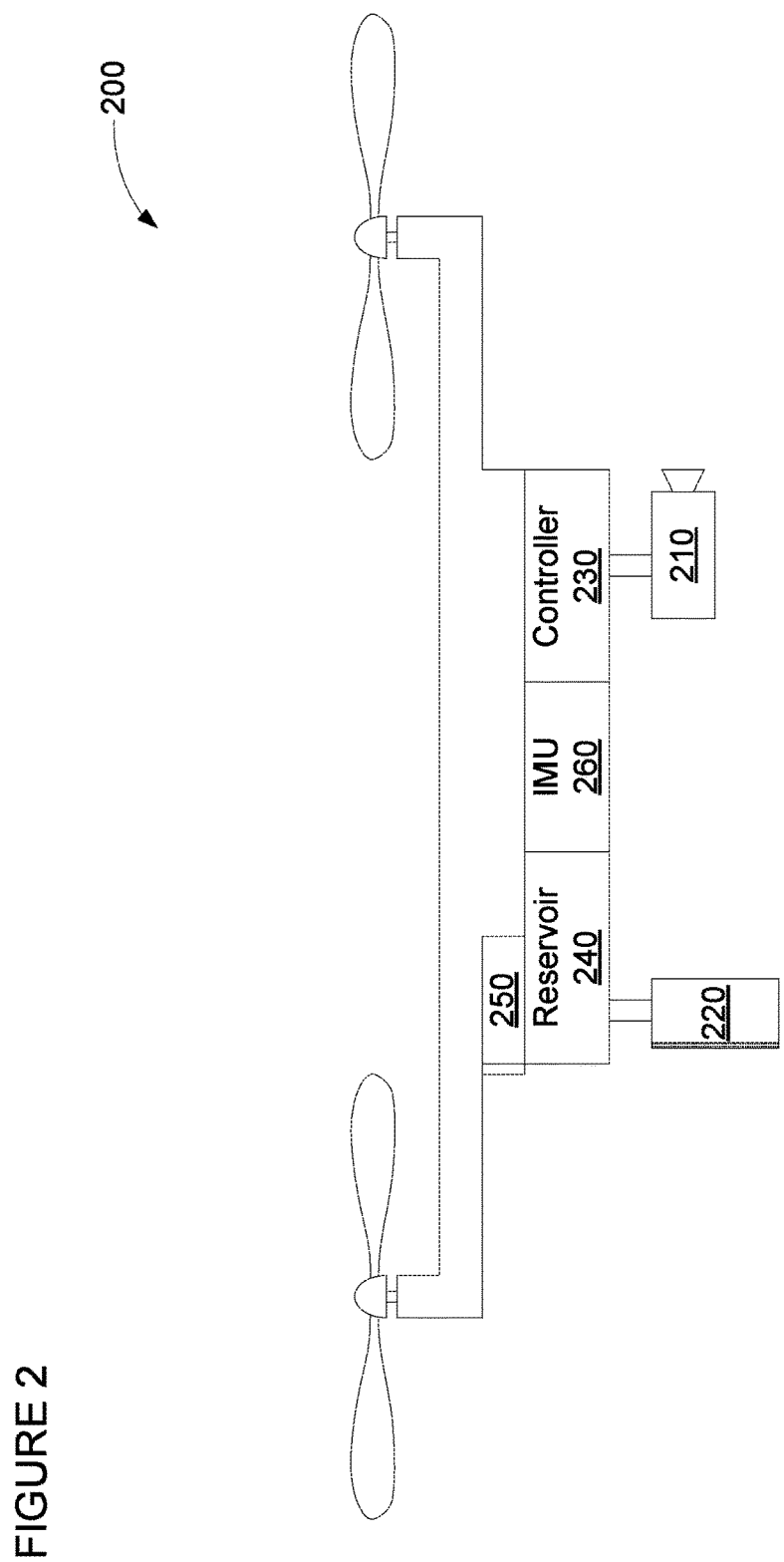
FIG. 2 is a schematic diagram of another example unmanned aerial vehicle to print on a print target.

FIG. 2 is a schematic diagram of another example unmanned aerial vehicle 200 to print on a print target. In the illustrated example, the unmanned aerial vehicle 200 may be a rotary-wing unmanned aerial vehicle. The unmanned aerial vehicle 200 may include a fixed wing, a flapping wing, or the like in other examples. The unmanned aerial vehicle 200 may include an EMR sensor 210. The EMR sensor 210 may include an antenna, an image sensor (e.g., a charge-coupled device, a complementary metal-oxide-semiconductor sensor, etc.), or the like. The EMR sensor 210 may detect EMR with a wavelength less than or no greater than a dot size on the print target. As used herein, the term "dot" refers to the smallest element of an image to be printed. The dot size on the print target may be 0.001, 0.002, 0.005, 0.01, 0.02, 0.05, 0.1, 0.2, 0.5 inches or the like. Accordingly, the EMR sensor 210 may detect microwave EMR (e.g., high frequency microwave EMR), terahertz EMR, infrared EMR, visible EMR, ultra violet EMR, X-ray EMR, or the like.

The EMR sensor 210 may include an array of EMR sensors with a mask to control which frequency of EMR arrives at each EMR sensor in the array. In an example, the EMR sensor 210 may include a mask that passes red, green, and blue light at distinct locations in the array. In other examples, the EMR sensor 210 may include a mask that passes more, fewer, or different frequencies. The EMR sensor 210 may detect a signal indicative of the substance to print at each dot. In an example, the EMR sensor 210 may detect the signal indicative of the substance to print at a particular dot only when the EMR sensor 210 is positioned at or positioned near the location where that dot is to be printed. In some examples, the EMR sensor 210 may detect signals corresponding to a plurality of neighboring dots. Each dot may be detected by a plurality of sensors in the array of EMR sensors. The EMR sensor 210 may be calibrated before printing, periodically or aperiodically during printing, or the like. The EMR sensor 210 may be calibrated based on emitted EMR corresponding to a test value, for example, while the unmanned aerial vehicle 200 is positioned at a location typical or representative of printing locations.

The unmanned aerial vehicle 200 may include a nozzle 220 to eject a substance. The nozzle 220 may eject the substance using pressure from a pump, a heating element, a piezoelectric element, or the like. The unmanned aerial vehicle 200 may include a reservoir 240 to store the substance. The nozzle 220 may be coupled to the reservoir 240 and receive the substance to be ejected from the reservoir 240. In some examples, the unmanned aerial vehicle 200 may include a plurality of nozzles, which may eject a single substance. In an example, the unmanned aerial vehicle 200 may include a plurality of reservoirs respectively containing a plurality of substances to be ejected by the plurality of nozzles.

The unmanned aerial vehicle 200 may include a controller 230. As used herein, the term "controller" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The controller 230 may determine whether to print the substance or which substance to print based on the signal detected by the EMR sensor 210. In an example, a frequency of the detected EMR may correspond to the substance to be printed, e.g., which color substance to print. The signal detected by the EMR sensor 210 may include light of a particular color, and the nozzle 220 may eject a substance of the particular color. As used herein, the term "color" refers to a point in a color space. A single color may include EMR of a plurality of frequencies. The controller 230 may determine the frequency of the detected EMR based on the measurements by the EMR sensor 210. In some examples, the controller 230 may determine whether the unmanned aerial vehicle 200 is able to print the indicated substance. For example, the unmanned aerial vehicle 200 may be carrying one substance or fewer than all possible substances. The controller 230 may instruct the nozzle 220 to eject a first substance stored in the reservoir 240 based on detecting a signal indicative of the first color and instruct the nozzle 220 not to eject based on detecting a signal indicative of a second color not stored in the reservoir 240. A single signal may include the first and second colors. In an example, the unmanned aerial vehicle 200 may carry several substances, and the controller 230 may determine which substance to print. In some examples, the unmanned aerial vehicle 200 may not include the controller 230, and measurements from the EMR sensor 210 may be directly provided to the nozzle 220 to trigger ejection of the substance. The EMR sensor 210 may include filters or a limited bandwidth so as to trigger the nozzle 220 for particular EMR signals.

When the signal includes visible light, the controller 230 may determine which substance to print by printing the color detected by the EMR sensor 210. In an example, the controller 230 may convert the detected colors from a first color space to a second color space. For example, the controller 230 may determine an amount of red, green, or blue in the detected signal, and the controller 230 may determine an amount of magenta, yellow, cyan, or black to eject from the nozzle 220 by converting the detected signal from an RGB color space to a CMYK color space. In some examples, the controller 230 may map detected frequencies to substances to be printed. For example, the controller 230 may determine an amount of magenta to eject based on an amount of red detected, an amount of yellow to eject based on an amount of green detected, an amount of cyan to eject based on an amount of blue detected, and an amount of black to eject based on an amount ultraviolet detected. The controller 230 may map a detected frequency, such as a detected color, to a non-color substance, such as a sealant, a coating, a melted filament, a material to be fused, or the like.

The controller 230 may distinguish the EMR signal from background EMR. The EMR signal may be modulated. In an example, the EMR signal may be turned on and off at a constant frequency (e.g., 2, 5, 10, 20, 50, 100 Hertz, etc.). The modulation of the EMR signal may be selected to avoid a frequency of line power so that the controller 230 does not mistake artificial EMR sources for the EMR signal. In some examples, the modulation may be a fraction or multiple of the frequency of line power, so the controller 230 can determine background EMR from artificial EMR sources. The controller 230 may compare measurements from the EMR sensor 210 at a plurality of points in time to distinguish the EMR signal from background EMR. The plurality of points in time may include a point in time when the EMR signal is transmitted and a point in time when the EMR signal is not transmitted. In some examples, the controller 230 may distinguish the EMR signal by subtracting a measurement that does not include the EMR signal from a measurement that does. If the EMR sensor 210 includes a plurality of sensor elements that detect each point, the controller 230 may average the measurements by the plurality of sensor elements detecting a particular point to reduce background noise further.

To print the substance accurately to the correct location, the controller 230 may cause the unmanned aerial vehicle 200 to maintain a fixed distance from the print target. The unmanned aerial vehicle 200 may include a distance sensor 250 to measure the distance to the print target. The distance sensor 250 may include an active or passive EMR sensor, an ultrasonic sensor, a capacitive sensor, or the like to measure the distance. The distance sensor 250 may indicate to the controller 230 the distance to the print target. The controller 230 may navigate the unmanned aerial vehicle 200 based on the indicated distance. For example, if wind causes the unmanned aerial vehicle 200 to deviate from the fixed distance, the controller 230 may navigate the unmanned aerial vehicle 200 to correct for the deviation.

To print the substance accurately to the correct location, the controller 230 may also cause the unmanned aerial vehicle 200 to maintain a constant velocity and constant orientation during printing. The unmanned aerial vehicle 200 may include an accelerometer, a gyroscope, or the like to determine movement, orientation (e.g., pitch, yaw, roll), etc. of the unmanned aerial vehicle 200. In the illustrated example, the unmanned aerial vehicle 200 may include an inertial measurement unit (IMU) 260 that includes an accelerometer and a gyroscope. The IMU 260 may indicate the acceleration, orientation, etc. of the unmanned aerial vehicle 200 to the controller 230. The controller 230 may determine the velocity of the unmanned aerial vehicle based on the acceleration. In an example, the controller 230 may determine the velocity or orientation based on measurements by the EMR sensor 210 (e.g., movement of dots across an image sensor). The controller 230 may determine the velocity or orientation based on measurements from only the IMU 260, only the EMR sensor 210, both the IMU 260 and the EMR sensor 210, or the like. The controller 230 may navigate the unmanned aerial vehicle 200 to maintain the constant velocity or constant orientation, which may include correcting deviations therefrom.

The controller 230 may determine when to eject the substance from the nozzle 220 based on measurements from the IMU 260 (e.g., movement detected by the accelerometer, an orientation determined by the gyroscope, etc.). The unmanned aerial vehicle 200 may be in motion during printing or oriented such that a line of nozzles are not aligned with dot edges, so the controller 230 may determine when to eject the substance so that the substance is delivered to the correct location on the print target. If the controller 230 maintains a constant velocity or constant orientation, the controller 230 may compute the ejection timing in advance based on the constant velocity or constant orientation. In an example, the controller 230 may compute the ejection timing dynamically based on variations from the constant velocity or constant orientation, movement at a non-constant velocity or non-constant orientation (e.g., movement along a non-linear or pseudorandom path, etc.), or the like. The EMR sensor 210 may detect a plurality of signals corresponding to neighboring dots, so the controller 230 may determine which dot to print next based on the neighboring dot in the direction of movement. Accordingly, the controller 230 may instruct the nozzle 220 to eject the substance for the neighboring dot as soon as the nozzle 220 is in position to begin printing the neighboring dot.

The EMR sensor 210 may be separated from the print target. Accordingly, the location on the print target at which the nozzle 220 will deliver the substance may be different from the location on the print target at which the signal may arrive if not intercepted by the EMR sensor 210. The controller 230 may correct for the offset between the signal destination and the nozzle print destination. In an example, the signal emitter (not shown) may adjust the direction in which the signal is transmitted to correct for the offset. If the controller 230 maintains a fixed distance from the print target, the controller 230 or the signal emitter may correct for the offset based on the fixed distance, based on a distance between the nozzle 220 and the EMR sensor 210, or the like. In some examples, the EMR sensor 210 or the nozzle 220 may be positioned to minimize the offset.

The controller 230 may use any of various strategies to determine where to navigate the unmanned aerial vehicle 210 and eject substance on the print target. In some examples, the controller 230 may not coordinate with other unmanned aerial vehicles (not shown) other than to avoid collisions. In an example, the controller 230 may coordinate with other unmanned aerial vehicles or a central authority to determine where to print. The controller 230 may navigate according to a fuzzy grid pattern in which the controller 230 may navigate the unmanned aerial vehicle 200 approximately perpendicular to an edge of the print target. For example, the controller 230 may navigate the unmanned aerial vehicle 200 laterally side-to-side across the print target until the entire surface has been printed. In an example, the controller 230 may navigate the unmanned aerial vehicle 200 in a pseudorandom pattern, which may include printing pseudorandom swaths until the entire surface has been printed.

Figure 3:
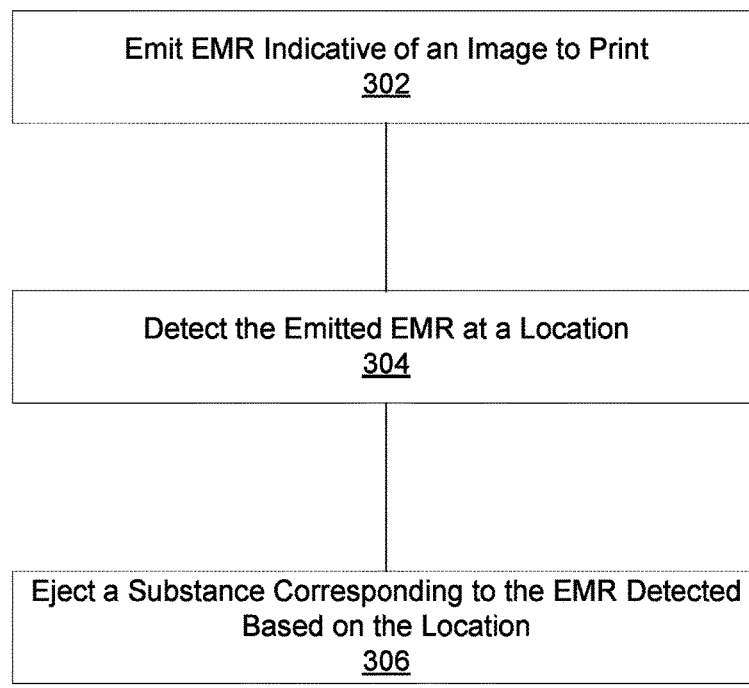
FIG. 3 is a flow diagram of an example method to print on a print target using an unmanned aerial vehicle.

FIG. 3 is a flow diagram of an example method 300 to print on a print target using an unmanned aerial vehicle. A processor may perform the method 300. At block 302, the method 300 may include emitting EMR indicative of an image to print. Emitting the EMR may include emitting EMR that varies based on a direction of emission. For example, a characteristic of the EMR, such as the frequency, amplitude or intensity, modulation, etc. of the EMR, may vary based on the direction of emission. The emitted EMR may be varied based on variations in the image to be printed.

Block 304 may include detecting the emitted EMR at a location using an unmanned aerial vehicle. Detecting the emitted EMR at the location may include navigating the unmanned aerial vehicle to the location and detecting the emitted EMR while the unmanned aerial vehicle is at the location. Detecting the emitted EMR may include detecting the characteristic of the EMR. For example, detecting the emitter EMR may include determining the frequency, amplitude or intensity, modulation, etc. of the EMR detected. The characteristic of the EMR may be sensed directly or may be computed based on measurements of the EMR.

Block 306 may include ejecting a substance corresponding to the EMR detected based on the location. Ejecting the substance may include determining the substance to be ejected or amount of substance to eject based on the characteristic of the EMR. Ejecting the substance based on the location may include ejecting the substance at the location, at an offset from the location, or the like. Ejecting the substance may include ejecting the substance using the unmanned aerial vehicle. In an example, the EMR emitter 510 of FIG. 5 may emit the EMR, the EMR sensor 110 of FIG. 1 may detect the emitted EMR, and the nozzle 120 of FIG. 1 may eject the substance.

Figure 4:
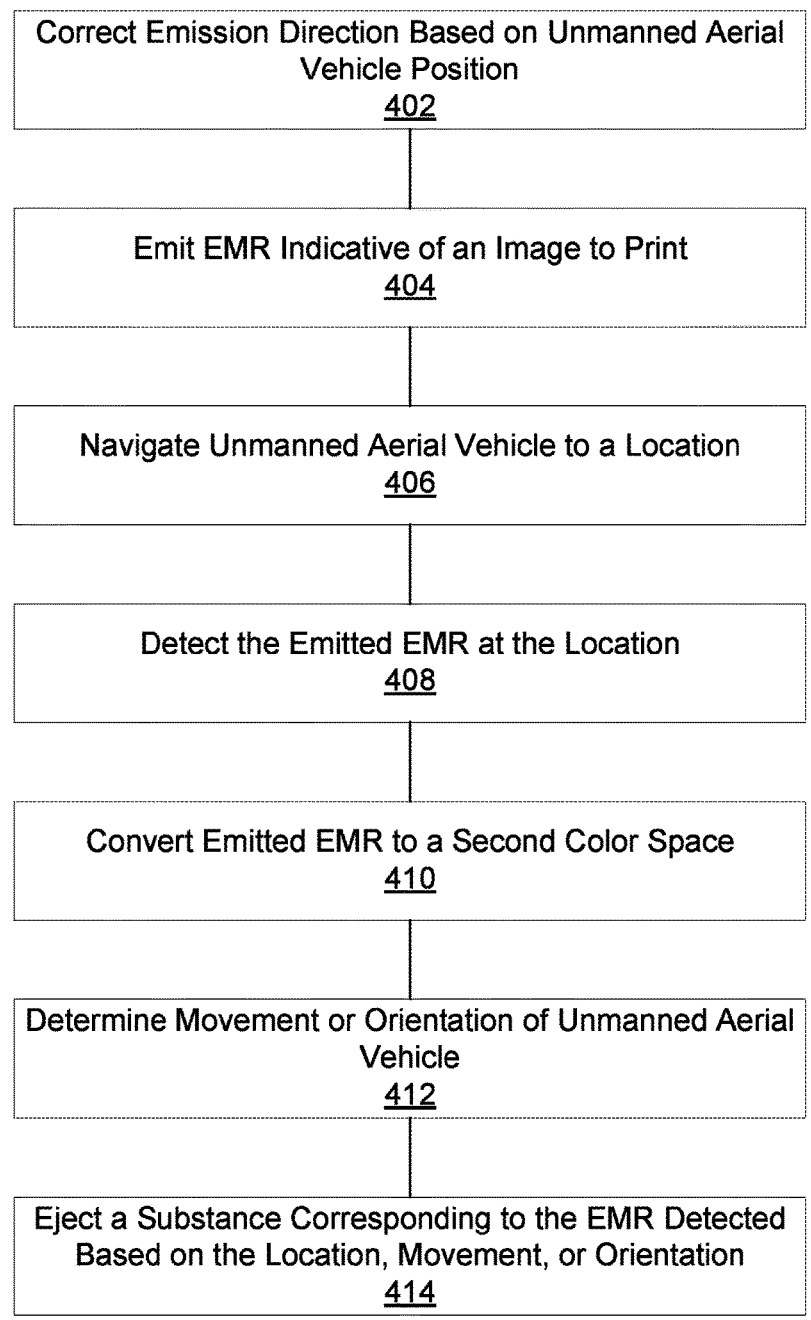
FIG. 4 is a flow diagram of another example method to print on a print target using an unmanned aerial vehicle.

FIG. 4 is a flow diagram of another example method 400 to print on a print target using an unmanned aerial vehicle. A processor may perform the method 400. At block 402, the method 400 may include correcting emission direction based on the position of the unmanned aerial vehicle. For example, EMR may arrive at the unmanned aerial vehicle at a different location than it arrives at the print target. Thus, aiming the EMR based on the print target may result in the unmanned aerial vehicle printing at an incorrect location. Accordingly, the direction of emission of the EMR may be corrected to compensate for the location of the unmanned aerial vehicle relative to the print target. In some examples, the ejection of the substance may include a correction to compensate for the location of the unmanned aerial vehicle relative to the print target.

At block 404, the method 400 may include emitting EMR indicative of the image to print. The emitted EMR may vary based on the direction of emission. For example, the image may comprise a plurality of dots corresponding to substances to be ejected onto the print target. The direction of emission may correspond to the locations of dots in the image, and the emitted EMR may be varied based on the substances to be ejected for that dot. For example, the frequency of the EMR may vary based on the substance to be ejected. The direction of emission may be selected so that the unmanned aerial vehicle will eject the substance at the correct location.

Block 406 may include navigating the unmanned aerial vehicle to a location. The unmanned aerial vehicle may navigate based on a fuzzy grid pattern, pseudorandom movements, or the like. At block 408, the method 400 may include detecting the emitted EMR at the location. An unmanned aerial vehicle may detect the emitted EMR. For example, the unmanned aerial vehicle may detect the emitted EMR when it arrives at the location or as it approaches the location. The emitted EMR detected at the location may include a characteristic indicative of the dot in the image to be printed at the location. The emitted EMR detected at the location may not include characteristics nor encoded information usable to determine the dots to be printed at other locations. In some examples, detecting the emitted EMR at the location may include detecting the emitted EMR at a plurality of locations at least substantially simultaneously (e.g., as proximate in time as an image sensor can achieve). For example, emitted EMR at the plurality of locations corresponding to a plurality of neighboring dots in the image may be detected using an image sensor.

Block 410 may include converting the emitted EMR to a second color space. Detecting the EMR at block 408 may include detecting EMR corresponding to a first color in a first color space. Converting the emitted EMR may include converting the first color to a second color in the second color space. For example, red light may be detected, and a mapping from the first color space to the second color space may be used to determine a gray level of cyan, black, or the like in the second color space based on the gray level of the red light. The amount of cyan, black, etc. to print may be determined based on the gray level.

Block 412 may include determining movement or orientation of the unmanned aerial vehicle. Determining movement may include determining velocity, acceleration, jerk, snap, etc. Determining orientation may include determining pitch, yaw, roll, etc. Determining the movement or orientation may include measuring the movement or orientation at the unmanned aerial vehicle, remotely measuring the movement or orientation of the unmanned aerial vehicle, or the like. In some examples, the unmanned aerial vehicle may be navigated to maintain a particular movement or orientation. Determining the movement or orientation may include determining the particular movement or orientation being maintained; comparing EMR, movement, or orientation measurements to intended movements or orientations; or the like. In an example, block 412 may be omitted if a particular movement or orientation is being maintained.

At block 414, the method 400 may include ejecting a substance corresponding to the EMR detected based on the location at which the EMR is detected, based on the movement or orientation of the unmanned aerial vehicle, or the like. For example, the substance may be ejected at the location at which the EMR is detected, at an offset from the location at which the EMR is detected, or the like. Timing of ejection may be based on movement of the unmanned aerial vehicle. For example, the movement of the unmanned aerial vehicle may impart momentum to the ejected substance, which may cause the substance to arrive at the print target at a location different than the one from which it is ejected. Accordingly, ejecting the substance may include ejecting the substance at a location that causes it to arrive at the correct destination. The orientation may affect the location of substance ejection relative to the location of EMR detection or may affect the relative locations of ejections from a plurality of locations on the unmanned aerial vehicle. Timing of ejection may be adjusted to compensate from effects of the orientation. In an example, the EMR emitter 610 of FIG. 6 may perform blocks 402 and 404; the controller 230 of FIG. 2 may perform blocks 406, 410, and 412; the EMR sensor 210 may perform block 408; and the nozzle 220 may perform block 414.

Figure 5:
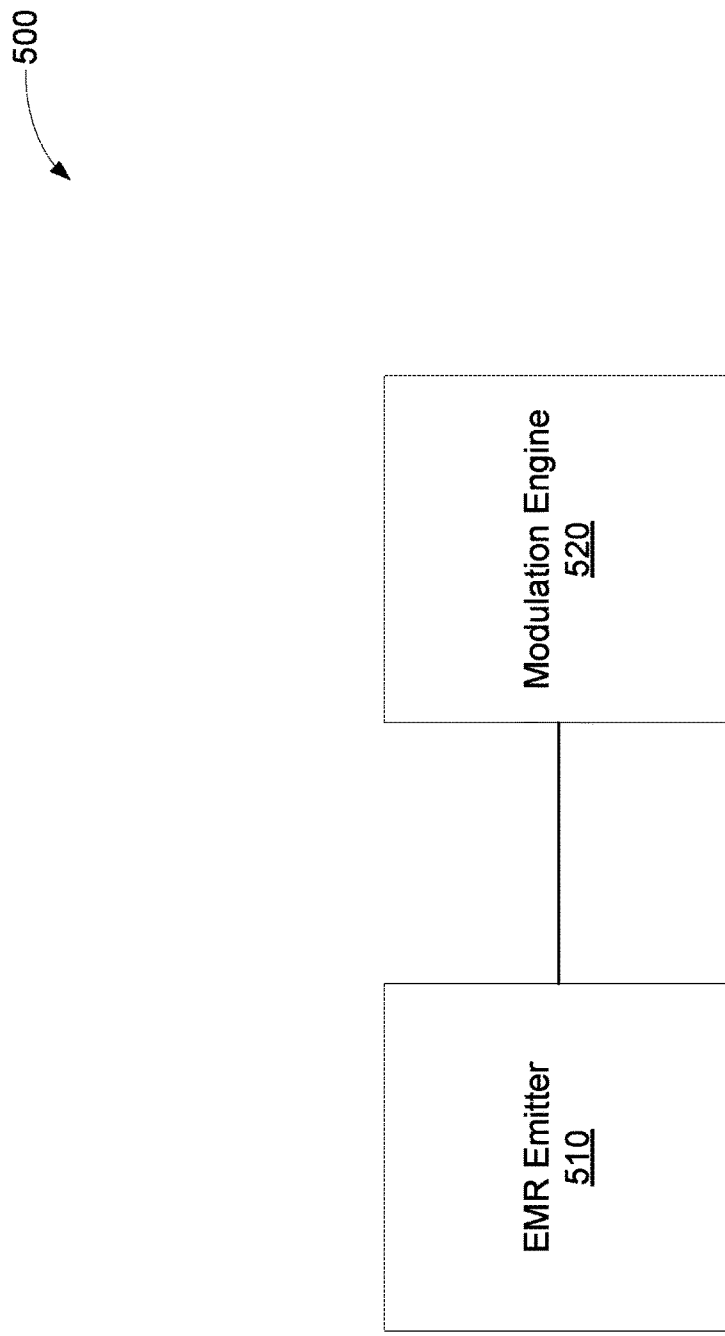
FIG. 5 is a block diagram of an example system to transmit print information to an unmanned aerial vehicle.

FIG. 5 is a block diagram of an example system 500 to transmit print information to an unmanned aerial vehicle. The system 500 may include an EMR emitter 510. As used herein, the term "EMR emitter" refers to a device that produces EMR. The EMR emitter 510 may include hardware (e.g., analog or digital circuitry, etc.) to generate the EMR, to modify characteristics of the EMR, to modulate an EMR signal, to direct the EMR, or the like. The EMR emitter 510 may emit EMR indicative of a first substance to print at a first location towards the first location. The EMR emitter 510 may also emit EMR indicative of a second substance to print at a second location towards the second location. In some examples, the EMR emitter 510 may emit the EMR indicative of which substance to print towards only the location at which that substance is to be printed. The EMR emitter 510 may not emit the EMR indicative of the first substance towards the second location nor emit the EMR indicative of the second substance towards the first location. In addition, the EMR may not indicate where the first or second substances are to be printed other than through the direction of emission of the EMR.

The system 500 may also include a modulation engine 520. As used herein, the term "engine" refers to hardware (e.g., a processor, such as an integrated circuit or other circuitry, an optical component, such as a lens or mirror, etc.) or a combination of software (e.g., programming such as machine- or processor-executable instructions, commands, or code such as firmware, a device driver, programming, object code, etc.) and hardware. Hardware includes a hardware element with no software elements such as an ASIC, an FPGA, etc. A combination of hardware and software includes software hosted at hardware (e.g., a software module that is stored at a processor-readable memory such as RAM, a hard disk or solid-state drive, resistive memory, or optical media such as a digital versatile disc DVD, and/or executed or interpreted by a processor), or hardware and software hosted at hardware. The modulation engine 520 may cause the EMR emitter 510 to emit the EMR with a modulation distinguishable from background EMR. In some examples, the modulation engine 520 may modulate the EMR and provide the modulated EMR to the EMR emitter 510. In an example, the modulation engine 520 may indicate the modulation to the EMR emitter 510, adjust power to the EMR emitter to control modulation, or the like. The modulation may be distinct from natural or artificial EMR likely to be encountered so that the emitted EMR can be distinguished from background EMR.

Figure 6:
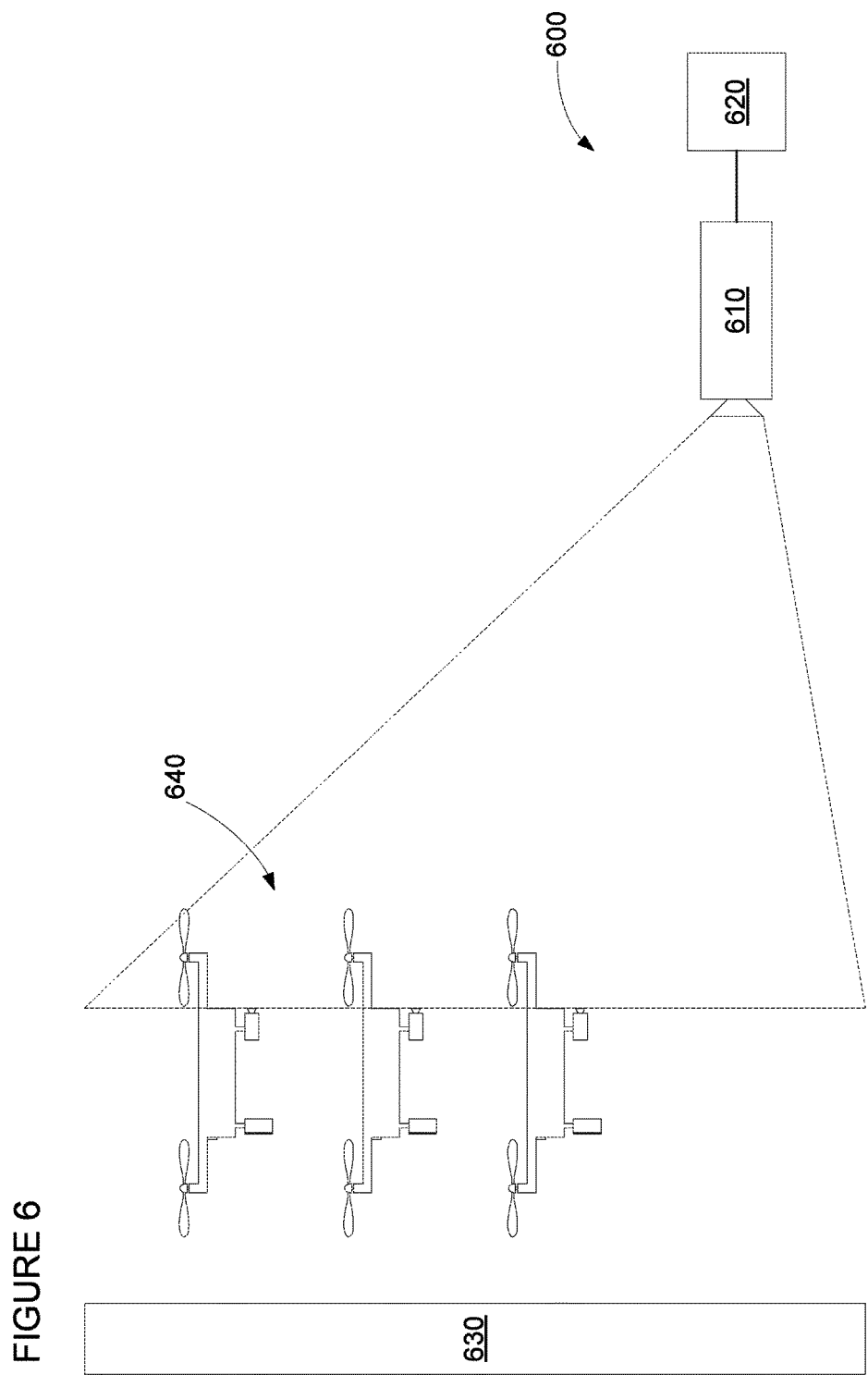
FIG. 6 is a schematic diagram of another example system to transmit print information to an unmanned aerial vehicle.

FIG. 6 is a schematic diagram of another example system 600 to transmit print information to an unmanned aerial vehicle. The system 600 may include an EMR emitter 610. In the illustrated example, the EMR emitter 610 may include a light projector. The EMR emitter 610 may emit EMR indicative of the substance to print towards the location at which that substance is to be printed. For example, the EMR emitter 610 may project an image to be printed using light of a plurality of colors. The color of the light emitted may be the color to be printed, but may need to be converted between color spaces (e.g., from an RGB color space to a CMYK color space or the like). In an example, the color or frequency of the EMR emitted may map to a substance to be printed. For example, the EMR emitter 610 may emit colors in an RGB color space to be printed as well as an additional frequency, such as infrared, ultraviolet, or the like, indicating where sealant should be applied. In an example, the EMR emitter 610 may emit light at a red frequency, an orange frequency, a yellow frequency, etc., and each frequency may correspond to a substance to be printed. However, the substance may not produce the color of the corresponding frequency on the print target (e.g., red light may correspond to a white substance, orange light may correspond to a magenta substance, yellow light may correspond to a yellow substance, etc.). In some examples, the EMR emitter 610 may project a first image indicative of a first set of substances to be printed (e.g., colors to print), and the EMR emitter 610 may project a second image indicative of a second set of substances to be printed (e.g., sealants, coatings, melted filament, material to be fused, etc.).

The system 600 may include a modulation engine 620. The modulation engine 620 may cause the EMR emitter 610 to emit the EMR with a modulation distinguishable from background EMR. For example, the modulation engine 620 may cycle power to the EMR emitter 610 at a predetermined frequency. Accordingly, background measurements may be performed when power is not delivered to the EMR emitter 610, and the emitted EMR may be measured when power is delivered to the EMR emitter 610. The background measurements can then be subtracted from the measured EMR. Artificial light may flicker at a frequency corresponding to that of line power. The rate at which power is cycled may be selected to be distinct from the frequency of the line power. In an example, the rate may be selected so measurements of the emitted EMR and of the background are both performed at peaks, both performed at troughs in the artificial light flicker, or the like.

The EMR emitter 610 may project an image to be printed towards a location at which the image is to be printed. In some examples, the EMR emitter 610 may emit the EMR indicative of the first substance at a predetermined offset from the first location where the first substance is to be printed. Thus, the EMR emitter 610 may not form an image on the print target 630 at the location where the image is to be printed. Rather, the EMR emitter 610 may produce an image that may be in focus and aligned with the edges of the print target 630 if the print target 630 were moved by a particular offset. The particular offset may be in a direction normal to the surface of the print target 630. The particular offset may be selected based on the distance of unmanned aerial vehicle image sensors from the surface of the print target 630 when the unmanned aerial vehicles 640 are printing. For example, the particular offset may be determined based on a predetermined distance between the unmanned aerial vehicles 640 and the print target 630 and based on the positions of the image sensors on the unmanned aerial vehicles 640.

In some examples, the system 600 may include a plurality of unmanned aerial vehicles 640. The unmanned aerial vehicles 640 may print on the print target based on the emitted EMR without coordinating with others of the plurality of unmanned aerial vehicles. The unmanned aerial vehicles 640 may navigate according to a fuzzy grid pattern, a pseudorandom pattern, or the like. The unmanned aerial vehicles 640 may detect each other and avoid collisions during navigation. The unmanned aerial vehicles 640 carry a single substance, a plurality of substances, the same substances as one another, different substances from one another, or the like. In some examples, at least one of the plurality of unmanned aerial vehicles 640 may detect EMR of a particular color or frequency and eject a non-color substance (e.g., a sealant, a coating, a melted filament, a material to be fused, etc.) based on the detection of the EMR of the particular color or frequency. For example, red light, ultraviolet light, or the like may correspond to the non-color substance.

Based on the location of the EMR emitter 610, there may be some distortion in the size, shape, or location of the dots in the projected image. The unmanned aerial vehicles 640 may correct for the distortion to the size, shape, or location based on a desired size or shape of dots on the print target 630, based on a location of the EMR emitter 610 relative to the print target 630, or the like. The unmanned aerial vehicles 640 may determine the modulation frequency of the EMR emitter 610 based on image sensors, based on separate sensors, or the like. The separate sensors may directly measure the modulation frequency, may receive a separate EMR transmission indicating the modulation frequency (e.g., a radio frequency (RF) transmission, etc.), or the like.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:
1. An unmanned aerial vehicle, comprising:
an electromagnetic radiation (EMR) sensor to detect a signal indicative of a substance to be printed and corresponding to an image to be printed; and
a nozzle to eject the substance based on a location at which the signal is detected.
2. The unmanned aerial vehicle of claim 1, further comprising a distance sensor to measure a distance to a print target; and a controller to maintain a fixed distance from the print target.
3. The unmanned aerial vehicle of claim 1, wherein the signal comprises light of a color, and wherein the nozzle is to eject a substance of the color.
4. The unmanned aerial vehicle of claim 3, wherein the light comprises a modulation, and wherein the unmanned aerial vehicle further comprises a controller to extract the color from background EMR based on the modulation.
5. The unmanned aerial vehicle of claim 1, further comprising a reservoir to store a substance of a first color, wherein the unmanned aerial vehicle does not store a substance of a second color, and wherein the unmanned aerial vehicle further comprises a controller to instruct the nozzle to eject the substance of the first color based on the EMR sensor detecting a signal indicative of the first color and to instruct the nozzle not to eject based on the EMR sensor detecting a signal indicative of the second color.
6. The unmanned aerial vehicle of claim 1, further comprising an accelerometer to detect movement of the unmanned aerial vehicle; and a controller to determine when to eject the substance from the nozzle based on measurements by the accelerometer and the location at which the signal is detected.
7. The unmanned aerial vehicle of claim 6, further comprising a gyroscope to determine an orientation of the unmanned aerial vehicle, wherein the controller is to determine when to eject the substance from the nozzle based on measurements by the gyroscope.
8. A method, comprising:
emitting electromagnetic radiation (EMR) indicative of an image to print, wherein the emitted EMR varies based on a direction of emission;
detecting at a location, using an unmanned aerial vehicle, the emitted EMR; and ejecting, based on the location of detection and using the unmanned aerial vehicle, a substance corresponding to the EMR detected.

9. The method of claim 8, wherein at least one of the emitting and the ejecting includes a correction to the direction of emission or the location of detection based on a position of the unmanned aerial vehicle.

10. The method of claim 8, further comprising navigating the unmanned aerial vehicle based on at least one of a fuzzy grid pattern and pseudorandom movement.

11. The method of claim 8, wherein detecting comprises detecting the emitted EMR with an image sensor, and wherein ejecting comprises ejecting a next substance detected at a location in the image sensor corresponding to the direction of movement.

12. The method of claim 8, wherein detecting the EMR comprises detecting EMR corresponding to a first color in a first color space, and wherein the method further comprises converting the first color to a second color in a second color space.

13. The method of claim 8, further comprising determining at least one of a velocity, a pitch, a yaw, and a roll, wherein ejecting the substance comprises determining ejection timing based on the at least one of the velocity, the pitch, the yaw, and the roll.

14. The method of claim 8, further comprising moving the unmanned aerial vehicle at a substantially constant velocity while ejecting the substance.

15. A system, comprising:
a electromagnetic radiation (EMR) emitter to emit EMR indicative of a first substance to print at a first location towards the first location and to emit EMR indicative of a second substance to print at a second location towards the second location, the EMR indicative of the first substance and the EMR indicative of a second substance corresponding to an image to be printed; and
a modulation engine to cause the EMR emitter to emit the EMR with a modulation distinguishable from background EMR.

16. The system of claim 15, wherein the EMR emitter is to emit light of a color to be printed, and wherein the modulation engine is to cycle power to the EMR emitter at a predetermined frequency.

17. The system of claim 15, wherein the EMR emitter is to project an image to be printed towards a location at which the image is to be printed.

18. The system of claim 15, wherein the EMR emitter is to emit the EMR indicative of the first substance at a predetermined offset from the first location based on a predetermined distance between an unmanned aerial vehicle and a print target.

19. The system of claim 15, further comprising a plurality of unmanned aerial vehicles, at least one of the plurality of unmanned aerial vehicles to detect EMR of a first color and to eject a non-color substance based on detection of the EMR of the first color.

20. The system of claim 15, further comprising a plurality of unmanned aerial vehicles, wherein each unmanned aerial vehicle is to print based on the emitted EMR without coordinating with others of the plurality of unmanned aerial vehicle.

* * * * *